United States Patent [19]

Ricco et al.

[11] Patent Number: 5,005,404

[45] Date of Patent: Apr. 9, 1991

[54] SYSTEM FOR DETERMINING AXIAL DISPLACEMENT OF A ROD, PARTICULARLY THE PLUNGER OF AN ELECTROMAGNETIC FUEL INJECTOR

[75] Inventors: Mario Ricco; Vincenzo Damiani, both of Bari; Michele Picciallo, Palese, all of Italy

[73] Assignee: Weber S.r.l., Turin, Italy

[21] Appl. No.: 507,653

[22] Filed: Apr. 10, 1990

[30] Foreign Application Priority Data

Apr. 12, 1989 [IT] Italy .............................. 67263 A/89

[51] Int. Cl.[5] ............................................ G01M 19/00

[52] U.S. Cl. ..................................... 73/119 A; 239/73

[58] Field of Search ............ 73/119 A; 239/73, 533.2, 239/533.3; 340/686

[56] References Cited

U.S. PATENT DOCUMENTS 4,362,051 12/1982 Schlagenhauf .................. 73/119 A

*Primary Examiner*—Jerry W. Myracle

*Attorney, Agent, or Firm*—Jeffers, Hoffman & Niewyk

[57] ABSTRACT

The present invention relates to a system for determining axial displacement of a rod forming part of a device comprising a member in which are formed at least two chambers containing high-pressure fluid and each defined by a respective surface portion of the rod. The system consists in forming a sliding coupling between the rod portion separating the two chambers and the seat in which the rod slides; in forming, on the aforementioned rod portion, a pair of annular grooves defining an annular surface portion; in forming at least a housing on the aforementioned member; and in fitting inside the housing a proximity transducer for determining displacement of the annular surface portion parallel to the rod.

7 Claims, 1 Drawing Sheet

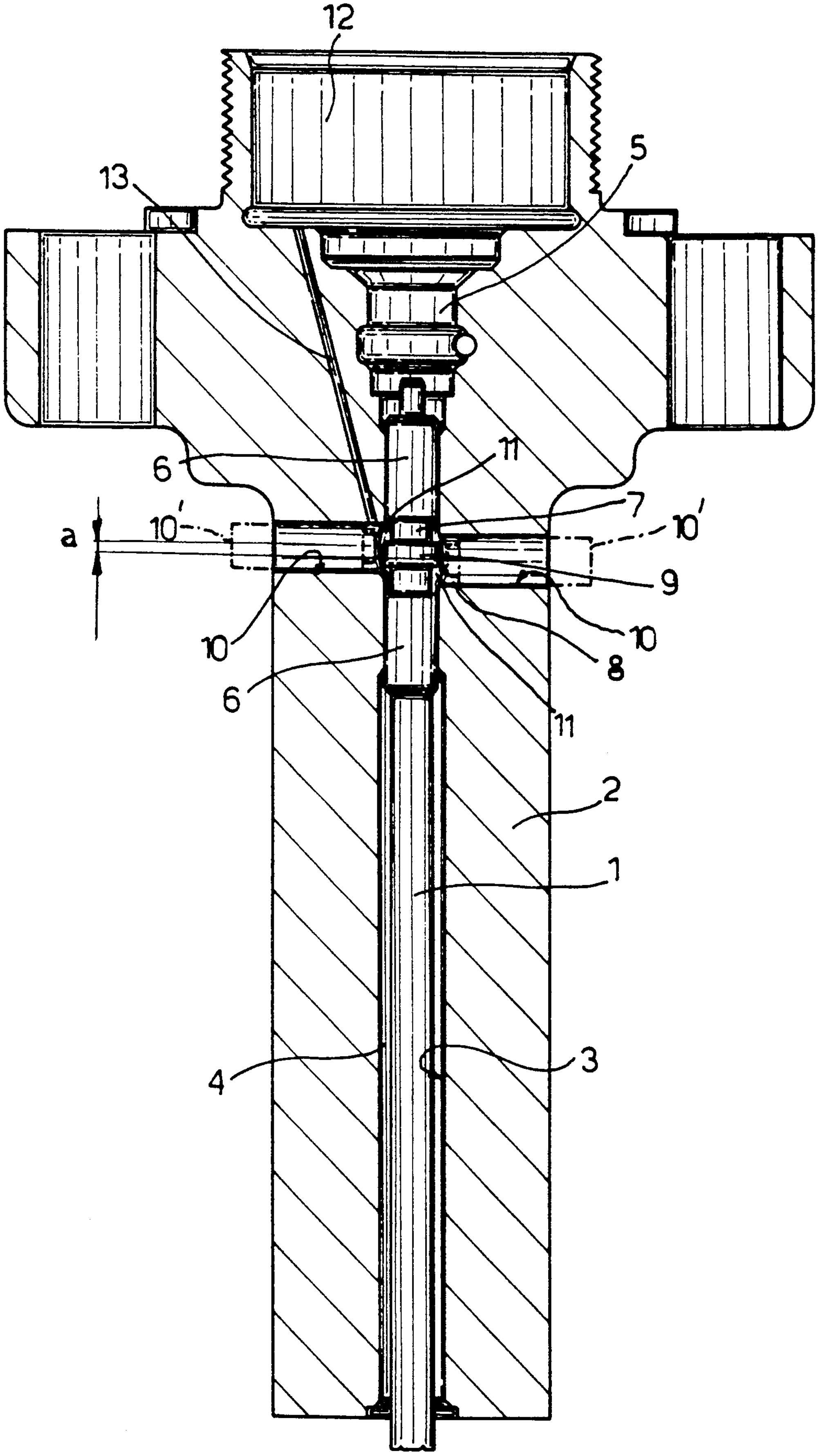
12
5
13
6
11
7
10'
a
10'
9
10
10
8
6
11
2
1
4
3

SYSTEM FOR DETERMINING AXIAL DISPLACEMENT OF A ROD, PARTICULARLY THE PLUNGER OF AN ELECTROMAGNETIC FUEL INJECTOR

Though the system proposed is particularly suitable for determining, to a high degree of accuracy, the displacement of a plunger on a device of the aforementioned type, it may also be employed for determining axial displacement of any type of rod forming part of other devices.

BACKGROUND OF THE INVENTION

The present invention relates to a system for determining axial displacement of a rod forming part of a device comprising a member in which are formed at least two chambers for a high pressure fluid (up to 2000 bar), and each defined by a corresponding surface portion of said rod; which system is particularly suitable for determining the travel of a plunger on an electromagnetic fuel injector.

On known devices of the aforementioned type, accurate measurements must be made of the travel of the plunger between the closed position, wherein it closes the injection orifice on the device, and the fully open position, bearing in mind that the plunger is housed inside a high-pressure chamber (as high as 2000 bar). By accurately determining the variation in travel as a function of time, it is possible to evaluate both injection advance and combustion inside the combustion chamber of the engine to which the device is fitted.

SUMMARY OF THE INVENTION

According to the present invention, there is provided a system for determining axial displacement of a rod forming part of a device comprising a member in which are formed at least two chambers for a high-pressure fluid, each said chamber being defined by a corresponding surface portion of said rod, and said member also presenting a seat for said rod enabling communication between said two chambers; characterised by the fact that it consists in forming a sliding coupling for said rod between said seat and a portion of said rod separating said two chambers; in forming on said portion of said rod a pair of annular grooves defining an annular surface portion; in forming on said member at least a housing communicating with said seat; and in providing inside said housing a proximity transducer for determining displacement of said annular surface portion.

BRIEF DESCRIPTION OF THE DRAWING

The system according to the present invention will be described in detail and by way of example with reference to the accompanying drawing, which shows the body and plunger of an electromagnetic fuel injector, the displacement of which plunger is determined using the system according to the present invention.

DETAILED DESCRIPTION OF THE INVENTION

Though, as already stated, the system according to the present invention is suitable for determining axial displacement of any type of rod forming part of any type of device, in the following description, the system will be described as employed for determining the displacement of plunger 1 inside body 2 of an electromagnetic fuel injector.

Said plunger 1 slides inside a seat 3 substantially consisting of an axial hole formed inside body 2. As the bottom of plunger 1 (not shown) provides for closing one or more injection orifices in the injector nozzle, plunger 1 normally travels between a closed position, wherein said injection orifices are closed, and an open position, wherein fuel is allowed to flow through said orifices.

The injector itself presents two chambers 4 and 5, the first extending between an outer surface portion of plunger 1 and the inner surface of seat 3, and the second formed over plunger 1 and coaxial with chamber 4. Chamber 4 normally contains pressurized fuel for injection through said injection orifices, whereas chamber 5 contains further pressurized fuel and acts as a control chamber on the injector. Plunger 1 is raised automatically in known manner when the pressure inside control chamber 5 is lowered by means of an electromagnetic valve, and the resulting pressure exerted on plunger 1 causes it to move upwards.

For determining displacement of plunger 1 according to the present invention, a sliding coupling for plunger 1 is provided between portion 6 of the same and the surface of seat 3. Said portion 6 separates chambers 4 and 5, and the radial clearance of said sliding coupling is so selected as to enable plunger 1 to slide freely inside seat 3, while at the same time substantially preventing fuel leakage from chambers 4 and 5.

According to the present invention, said portion 6 of plunger 1 presents two annular grooves 7 and 8 defining an annular surface portion 9, as shown clearly in the drawing. The system according to the present invention also consists in forming on body 2 at least a housing communicating with seat 3, and in providing inside said housing a proximity transducer 10' for determining displacement of said annular surface portion 9.

Each housing 10 may consist simply of a hole having its axis perpendicular to that of seat 3. As shown in the accompanying drawing, a pair of housings 10 may conveniently be provided for respective proximity transducers 10' separated in the direction of the plunger axis. The distance between the axes of said holes is indicated "a" in the accompanying drawing. Alternatively, instead of one pair, provision may be made for two pairs of housings 10 for respective proximity transducers, the housings in each said pair being separated in the direction of the plunger axis. The annular cavities 11 formed between the surface of seat 3 and annular grooves 8 and 9 of portion 6 of plunger 1 communicate with each other and with a drain chamber 12 via a duct 13, so as to convey inside chamber 12 any fuel leaking from chambers 4 and 5 into grooves 11 through the radial clearance of the coupling between plunger portion 6 and seat 3.

Proximity transducers 10' inside housings 10 may be of any known type, for determining displacement of annular surface portion 9, for example, as a function of a variation in capacity or magnetic flux.

The signals produced by transducers 10' may be supplied to any type of device capable of processing said signals in any manner, e.g. for indicating displacement of plunger 1, or the manner in which said displacement varies as a function of time. The system according to the present invention therefore provides for determining displacement of the rod both quickly and easily, and requires only straightforward mechanical machining of the injector components for forming annular grooves 7 and 8 and holes 10. Moreover, said mechanical machining in no way affects the characteristics of the injector, which is in no way impaired by the rod displacement determining function, despite the rod operating in a high-pressure chamber of up to 2000 bar.

In particular, should the system according to the present invention feature, not one, but two transducers 10' as shown in the accompanying drawing, these may be connected in the known so-called half inductive bridge configuration to obtain a highly reliable signal, especially as regards thermal drift. Should member 2 feature two pairs of transducers 10', with the transducers in each pair separated in the direction of the rod axis, said transducers may be connected in the known so-called full inductive bridge configuration.

To those skilled in the art it will be clear that changes may be made to both the design and arrangement of the component parts of the embodiment described and illustrated herein without, however, departing from the scope of the present invention.

We claim:

1. An apparatus comprising:

a body including a seat portion and a housing in communication with said seat portion;

a rod disposed in said seat portion, said rod having surface portions;

said body and said surface portions defining two chambers for high pressure fluid, said rod including a separating portion disposed between said two chambers;

said seat portion enabling fluid communication between said two chambers;

said separating portion slidably coupled with said seat portion, said separating portion including a pair of annular grooves defining an annular surface portion of said rod; and a proximity transducer disposed within said housing of said body, said proximity transducer for determining displacement of said annular surface portion.

2. The apparatus of claim 1 wherein said body includes two of said housings, and two respective proximity transducers, each said prospective proximity transducer disposed within each said housing, said proximity transducers connected in a half inductive bridge configuration.

3. The apparatus of claim 1 wherein said body includes two pairs of vertically aligned housings, and two respective pairs of said proximity transducers, each said pair of said proximity transducers disposed within each said pair of housings, each said pair of housings being vertically spaced from the other said pair of housings, said proximity transducers connected in a full inductive bridge configuration.

4. The apparatus of claim 1 wherein said rod further includes annular cavities defined by said annular grooves and said seat portion, and said body further includes a duct and a drain chamber, said annular cavities being disposed between said two chambers, said drain chamber being in fluid communication with one of said two chambers, and said duct providing fluid communication between said annular cavities and said drain chamber for collecting any fluid leaking from between said separating portion and said seat portion.

5. The apparatus of claim 1 wherein said seat portion includes an axial bore of said body, and said housing includes a hole of said body, said hole having an axis which is perpendicular to said axial bore and in communication with said axial bore.

6. The apparatus of claim 5 wherein one of said chambers is defined by said rod and said axial bore, and the other of said chambers includes a cavity in said body which is coaxial with said seat portion and extends axially beyond said rod.

7. The apparatus of claim 1 wherein said body comprises an electromagnetic fuel injection valve body, and said rod comprises a valve plunger.

* * * * *